L. BENSON.
FISHING REEL.
APPLICATION FILED OCT. 21, 1919.
1,351,549.
Patented Aug. 31, 1920.
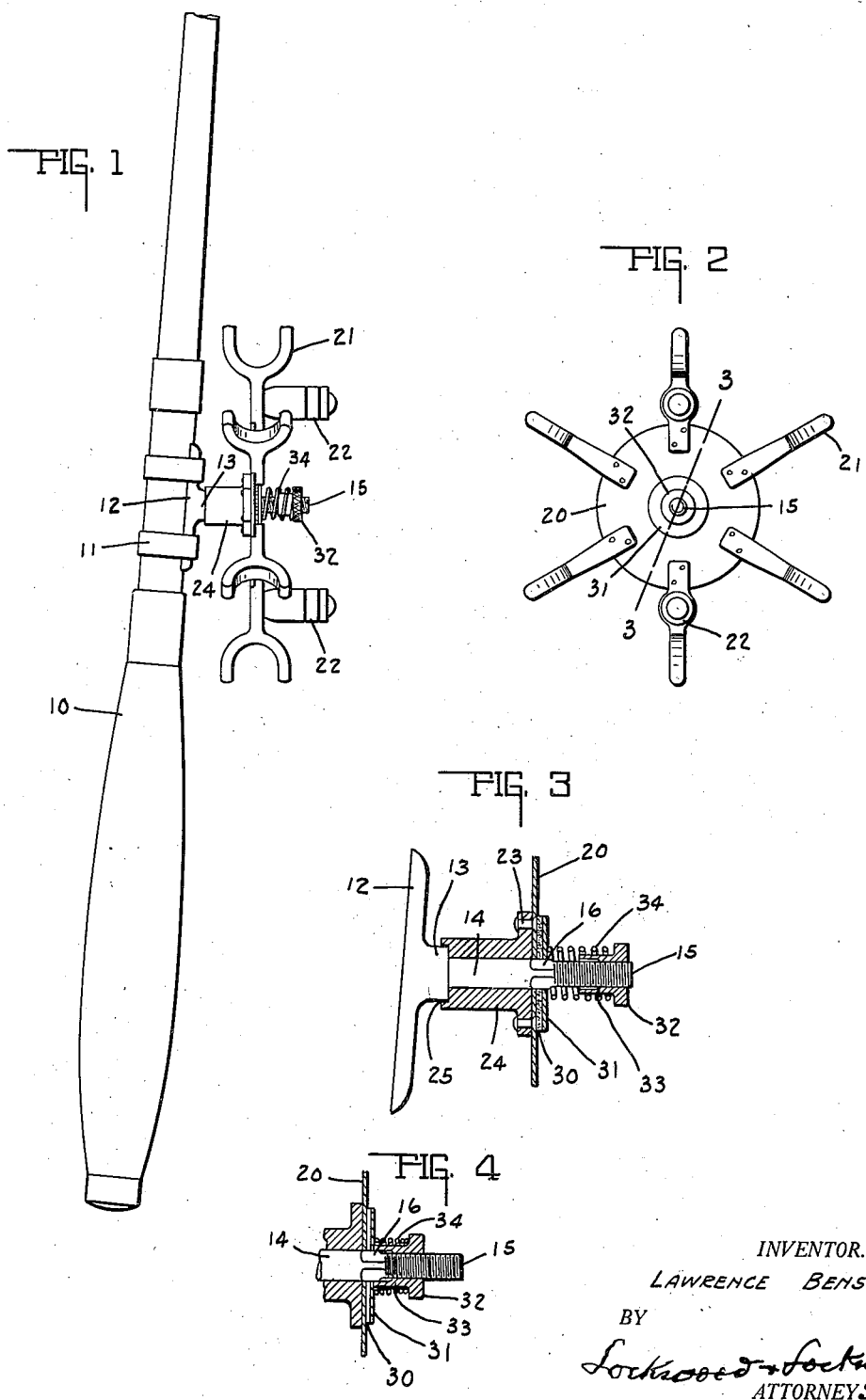
INVENTOR.
LAWRENCE BENSON
BY
Lockwood & Lockwood
ATTORNEYS.

UNITED STATES PATENT OFFICE.

LAWRENCE BENSON, OF KOKOMO, INDIANA.

FISHING-REEL.

1,351,549. Specification of Letters Patent. Patented Aug. 31, 1920.

Application filed October 21, 1919. Serial No. 332,160.

*To all whom it may concern:*

Be it known that I, LAWRENCE BENSON, a citizen of the United States, and a resident of Kokomo, county of Howard, and State of Indiana, have invented a certain new and useful Fishing-Reel; and I do hereby declare that the following is a full, clear, and exact description thereof, reference being had to the accompanying drawings, in which like numerals refer to like parts.

The object of this invention is to improve the construction and operation of fishing reels, which is very simple in construction and at the same time prevents the back lashing of the reel.

One feature of the invention consists in a particular mounting of the reel whereby frictional means tends to retard the rotation thereof, and said frictional means is readily adjustable. This prevents the back lashing of the reel and enables one to cast for an unusual distance.

Another feature of the invention is the arrangement of said mounting so as to adapt the reel for different varieties of fishing. In one condition of the mounting it is adapted for long distance casting, and in another condition of mounting there is greater resistance to the rotation of the reel, suitable for certain types of fish and for trolling. In another condition of the mounting the reel is locked against rotation, which adapts it for still different types of fishing and for trolling where one wishes a locked reel.

The full nature of this invention will be understood from the accompanying drawings and the following description and claims.

In the drawings Figure 1 is a plan view of the reel and a portion of the rod with which it is connected. Fig. 2 is a side elevation of the reel. Fig. 3 is a central longitudinal section through the mounting of the reel, parts being broken away and the mounting being shown so that the reel is retarded by a reasonable degree of friction for certain types of fish. Fig. 4 is a reproduction of the portion of Fig. 3 showing the reel locked.

In the drawings there is shown a rod 10 with the usual bands 11 for mounting in connection with the rod the reel hereafter described.

The reel has the usual shank 12 which is secured to the rod by the bands 11 and from which a cylindrical shoulder 13 extends which carries the spindle 14. This spindle has a cylindrical portion adjacent its attachment to the shoulder 13, and has a threaded outer end 15 relatively long and an intermediate relatively short square portion 16.

The reel proper has a reel plate 20 from which reel forks 21 extend radially, and to some of them finger pieces or handles 22 extend at right angles for the actuation or rotation of the reel. The reel plate is secured by the screws 23 to the hub 24 which fits on the round portion of the spindle 14, and its inner end is recessed so as to provide the flange 25 which overhangs the end of the shoulder 13, to prevent the line or any other object at any time wedging between the parts 13 and 24.

On the square portion 16 of the spindle parts constituting practically a brake are mounted, consisting of a felt washer 30 bearing against the reel plate 20, and a metal washer 31 bearing against the outer side of the felt washer for forcing the felt washer against the reel plate 20. The metal washer has a square aperture that snugly fits the square portion 16 of the spindle to prevent the rotation of the washer 31. A set screw 32 is screwed on the threaded portion 15 of the spindle and it has a relatively long inwardly extending sleeve 33 recessed so that it will not engage or interlock the square portion 16 of the spindle when screwed in to its limit. The spiral spring 34 surrounds the sleeve 33 and lies behind the nut 32 and the friction washer 31 in position to force said washer and the felt washer 30 against the reel plate 20.

The parts are so formed and arranged as to size, relative to each other, that when the set screw 32 is at its outermost position on the spindle, the spring 34 will only slightly press the felt washer against the reel plate and create therewith not sufficient friction to prevent a very long cast, but sufficient friction to stop the reel at the end of the cast and prevent any back lash. When the set screw is screwed in farther, for instance the position shown in Fig. 3, it will create relatively small resistance to the rotation of the reel, but still permits the reel satisfactory casting and yet prevents any back lash.

The extent of the friction action against the reel is adjusted according to the bait used and the distance it is desired to cast, when flies the friction should be slighter, and with heavier bait the friction should be greater. The result is, with this simple arrangement long distance casting is permitted with any kind of bait and back lash is prevented as successfully as with the reels equipped with devices for preventing the back lash, and this constitutes the chief feature of this invention.

For trolling the frictional resistance is increased materially and for some kinds of fishing the reel is locked by screwing the nut 32 in until the sleeve 33 engages the washer 31 and locks the parts rigidly on the spindle. Since the spiral spring 34 surrounds the sleeve 33 and the sleeve 33 is large enough to extend over and not interfere with the squared portion of the spindle, such action of the sleeve is permitted. Thus it is seen that this simple form of reel construction is adapted for any kind of fishing and preventing back lash.

In the preferred combination of my invention I have shown the reel forks as integral members and rigidly and radially secured to the reel plate 20 by suitable means. Should the reel fork 21 become broken this construction permits of its replace with relative ease, and at a very little cost and does not necessitate the replacement of the entire reel plate, as would be the case if the same were cast integral.

The invention claimed is:

1. A fishing reel including a spindle having a shoulder at one end thereof and with the outer end threaded and an intermediate angular portion, a reel plate, a hub mounted on the round portion of said spindle with one end bearing against said shoulder and with the other end secured to said plate, a yielding washer with an angular opening mounted on the angular portion of said spindle and engaging the outer side of said plate, a nut on the threaded end of said spindle with an inwardly extending sleeve recessed so that when the nut is screwed inwardly it will not engage the angular portion of said spindle, and a spiral spring surrounding said sleeve with one end bearing against the nut and the other end bearing against said washer.

2. A fishing reel including a spindle with a shoulder at the inner end thereof, and with the outer end thereof threaded, a reel plate, radially extending reel forks on said reel plate, an elongated spacing hub secured to one side of said reel plate and mounted on said spindle, the free end of said hub being recessed to inclose and engage said shoulder, a friction washer loosely mounted on said spindle and having one face frictionally engaging the other side of the reel plate, a metal washer mounted on said spindle and bearing against the other face of said friction washer, a spring surrounding said spindle with its inner end bearing against said metal washer, and a nut on the threaded end of spindle for adjusting the tension of said spring.

3. A fishing reel including a spindle with a shoulder thereon and with the outer end thereof exteriorly threaded, and an intermediate angular portion, a reel plate, a hub mounted on the round portion of the spindle with one end of the hub engaging said shoulder, said hub being secured to said plate, a friction washer with an angular opening mounted on the angular portion of said spindle and frictionally engaging the reel plate, a spring surrounding said spindle with its inner end bearing against said friction washer, and a nut on the exteriorly threaded end of the spindle for adjusting the tension of said spring to eliminate back lash and the like, said nut having an inwardly extending spring supporting sleeve portion adapted to telescope said angular portion of said spindle to directly engage the friction washer to lock the reel for still fishing when said nut is at the inner limit of movement of the spindle.

In witness whereof I have hereunto affixed my signature.

LAWRENCE BENSON.